(12) United States Patent
Hassett

(10) Patent No.: US 7,287,932 B2
(45) Date of Patent: Oct. 30, 2007

(54) BALLASTING SYSTEM FOR ON-SITE SEWAGE TREATMENT AND DISPOSAL SYSTEM

(75) Inventor: Alan F. Hassett, Berwyn, PA (US)

(73) Assignee: The English Oak Partnership, L.P., Berwyn, PA (US)

( * ) Notice: Subject to any disclaimer, the term of this patent is extended or adjusted under 35 U.S.C. 154(b) by 0 days.

(21) Appl. No.: 11/465,940

(22) Filed: Aug. 21, 2006

(65) Prior Publication Data

US 2007/0041792 A1    Feb. 22, 2007

Related U.S. Application Data

(60) Provisional application No. 60/710,255, filed on Aug. 22, 2005.

(51) Int. Cl.
*E02D 3/00* (2006.01)

(52) U.S. Cl. .................. 405/43; 405/38; 405/258.1

(58) Field of Classification Search ............ 405/38, 405/43, 36, 258.1, 129.1
See application file for complete search history.

(56) References Cited

U.S. PATENT DOCUMENTS

| | | | |
|---|---|---|---|
| 3,206,900 A * | 9/1965 | Doyle et al. ............ 52/128 |
| 3,465,527 A * | 9/1969 | Rohmer ............... 405/53 |
| 5,017,041 A | 5/1991 | Nichols |
| 5,156,488 A | 10/1992 | Nichols |
| 5,336,017 A | 8/1994 | Nichols |
| 5,435,666 A * | 7/1995 | Hassett et al. ......... 405/128.45 |
| 5,827,010 A | 10/1998 | Hassett |
| 6,132,141 A * | 10/2000 | Kirk ..................... 405/172 |

* cited by examiner

*Primary Examiner*—John Kreck
(74) *Attorney, Agent, or Firm*—Akin Gump Strauss Hauer & Feld LLP

(57) ABSTRACT

A ballasting system for an on-site sewage treatment and disposal system for areas having a ground water level above a minimum depth below grade. A perimeter barrier is arranged around a selected subterraneal volume within a ground area. The perimeter barrier has a circumference and a closed end closest to atmosphere. A pump having a gas intake and a discharge side which discharges gas at a pressure greater than atmospheric pressure is also provided. The discharge side of the pump is in fluid communication with the selected subterraneal volume to lower the ground water level within the perimeter barrier to a level at or below the minimum depth below grade. A flexible membrane is located adjacent the perimeter barrier end and within the ground area. The flexible membrane extends over substantially the entire circumference of the perimeter barrier. A plurality of ballasting beams is located above the flexible membrane and within the ground area. Each of the beams extends across the circumference of the perimeter barrier. Each end of the beams is anchored within the ground area by an anchor.

22 Claims, 2 Drawing Sheets

BALLASTING SYSTEM FOR ON-SITE SEWAGE TREATMENT AND DISPOSAL SYSTEM

CROSS-REFERENCE TO RELATED APPLICATIONS

This application claims the benefit of U.S. Provisional Application No. 60/710,255, filed Aug. 22, 2005.

BACKGROUND OF THE INVENTION

This invention generally relates to ballasting systems and, more particularly, to ballasting systems for on-site sewage treatment and disposal systems.

Septic tanks with a leach or drain field are commonly used in areas without public sewer systems. A septic tank in a private waste disposal system receives household sewage, and separates the solid matter from effluent before the effluent is discharged. Bacteria in the septic tank decomposes or digests the sewage. The effluent is discharged to a drain or leach field, typically composed of underground perforated PVC piping or drainage tiles that distribute the liquid effluent into the earth, where additional bacterial action takes place.

Public health agencies and zoning codes for specific areas generally dictate the conditions for the installation of a septic system, as described above, and require a certain range of perc rates for the soil as well as a minimum depth below grade to groundwater (which provides a minimum thickness of unsaturated soil) in order to allow the leach field to operate in its intended manner.

Below grade leach field installations are generally not permitted in areas where the natural groundwater level is too high. While the specific requirements may vary from state to state, or by local jurisdictions and municipalities, generally, the seasonal high groundwater level must be at least three feet below grade in order to obtain a permit for installation of a below grade leach field.

One known solution to this problem is to install an elevated sand mound (a/k/a Wisconsin Mound") above grade and place the leach field in the sand mound. A pump is then used to transfer effluent from the septic tank to the leach field. However, sand mounds are much more costly to install than below grade drain fields, and have an undesirable appearance.

An alternative to the sand mound system is a system, such as the one disclosed in U.S. Pat. Nos. 5,435,666 and 5,827,010, in which the separation distance is achieved by lowering the water table beneath the drain field. Such systems use air pressure to keep the water table down in order to achieve the required separation distance. The use of air pressure, however, also acts to force the system upward within the ground. Therefore, some form of ballast is necessary to maintain the system within the ground and inhibit it from migrating upwardly within the ground. Ballast, such as fill, engineered steel assemblies, and/or concrete slabs having a length and width exceeding a length and width of the drain field surface, has been used and is generally effective. However, the use of fill is prohibited in some areas, such as flood plains, and the use of steel as ballast is not optimal because steel tends to degrade over time and generally requires cathodic protection for corrosion control. Concrete slabs tend to be a relatively expensive ballast alternative. Additionally, concrete slabs are required to be broken up with a jackhammer or other such machine to be removed and cannot be easily disassembled and reused.

It is therefore desirable to provide a ballasting system which does not require fill, does not use steel, and/or does not require large, non-reusable concrete slabs for such below grade drain fields.

SUMMARY OF THE INVENTION

Briefly stated, the present invention is directed to a ballasting system for an on-site sewage treatment and disposal system for areas having a ground water level above a minimum depth below grade. A perimeter barrier is arranged around a selected subterraneal volume within a ground area. The perimeter barrier has a circumference and an end closest to atmosphere. A pump having a gas intake and a discharge side which discharges gas at a pressure greater than atmospheric pressure is also provided. The discharge side of the pump is in fluid communication with the selected subterraneal volume to lower the ground water level within the perimeter barrier to a level at or below the minimum depth below grade. A flexible membrane is located adjacent the perimeter barrier end and within the ground area. The flexible membrane extends over substantially the entire circumference of the perimeter barrier. A plurality of ballasting beams is located above the flexible membrane and within the ground area. Each of the beams extends across the circumference of the perimeter barrier. Each end of the beams is anchored within the ground area by an anchor.

In another aspect, the present invention is directed to a ballasting system for an on-site sewage treatment and disposal system for areas having a ground water level above a minimum depth below grade. A perimeter barrier is arranged around a selected subterraneal volume within a ground area. The perimeter barrier has a circumference and an end closest to atmosphere. A pump having a gas intake and a discharge side which discharges gas at a pressure greater than atmospheric pressure is also provided. The discharge side of the pump is in fluid communication with the selected subterraneal volume to lower the ground water level within the perimeter barrier to a level at or below the minimum depth below grade. A plurality of ballasting beams is located above the perimeter barrier and within the ground area. Each of the beams extends across the circumference of the perimeter barrier. Each end of the beams is anchored within the ground area by an anchor.

BRIEF DESCRIPTION OF THE SEVERAL VIEWS OF THE DRAWINGS

The following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
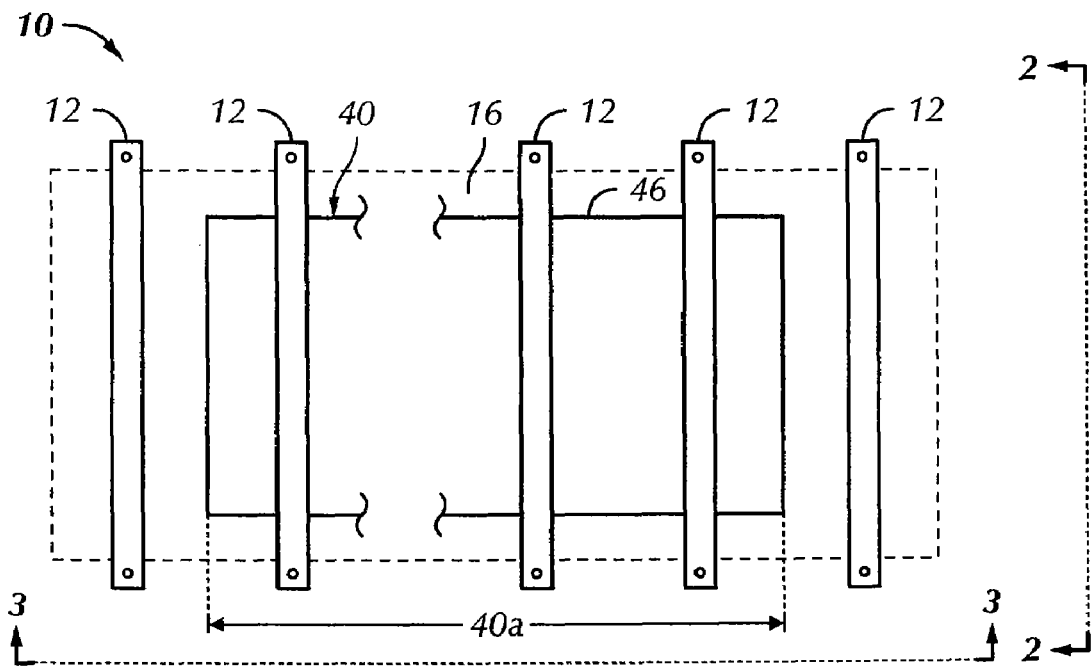
FIG. 1 is a top plan view of a ballasting system in accordance with a preferred embodiment of the present invention.

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Figure 2:
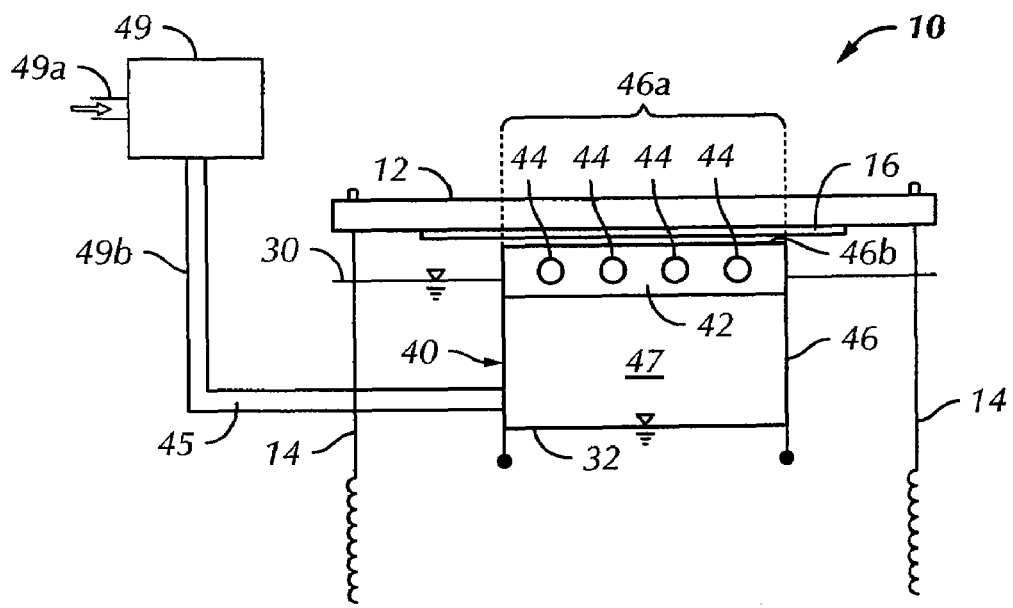
FIG. 2 is a cross-sectional view of the ballasting system of FIG. 1, taken along line 2—2 of FIG. 1.
Figure 3:
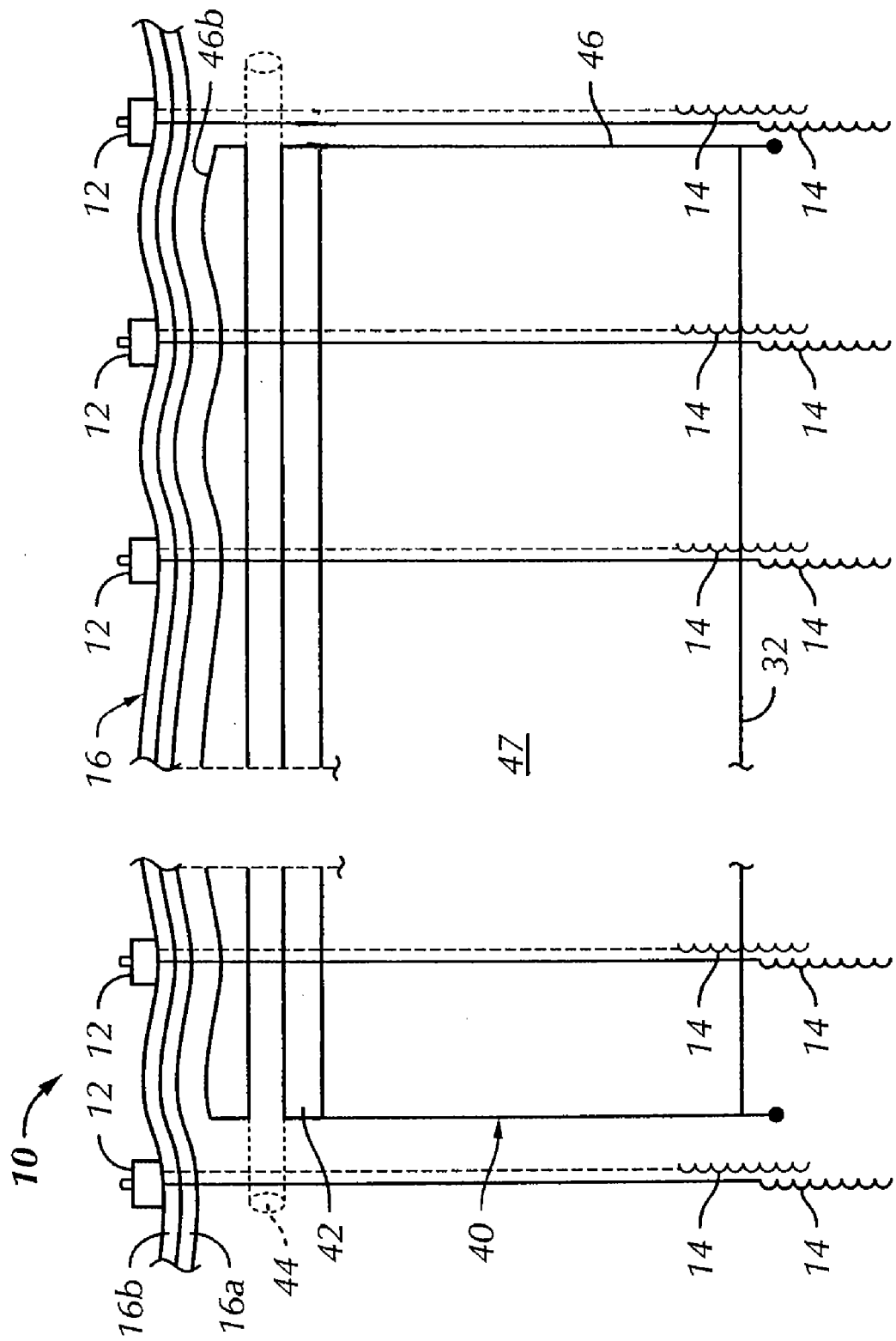
FIG. 3 is a cross-sectional view of the ballasting system of FIG. 1, taken along line 3—3 of FIG. 1.

Referring now to the drawings in detail, wherein like numerals indicate like elements throughout, there is shown in FIGS. 1-3 a preferred embodiment of a ballasting system, generally designated 10, in accordance with the present invention. The ballasting system 10 is intended to be used with an on-site sewage treatment and disposal system 40 for areas having a ground water level above a minimum depth below grade, such as the system disclosed in U.S. Pat. Nos. 5,435,666 and 5,827,010 (the Hassett patents), which are incorporated herein by reference. As such, the sewage disposal system 40 will only be generally described below, with additional details and description of the structure and operation of the sewage disposal system 40, as well as description of the structure and operation of the sewage treatment system (not shown), set forth in the Hassett patents.

Referring specifically to FIGS. 2 and 3, the sewage disposal system 40 includes a dispersal field 42 within which drainage pipes 44 are disposed. Although four drainage pipes 44 are shown, it is within the spirit and scope of the present invention that more or less drainage pipes 44 may be used.

A perimeter barrier 46 is preferably arranged around a selected subterraneal volume 47 within a ground area. The selected subterraneal volume 47 is of a sufficient size for containing the sewage disposal system 40. The perimeter barrier 46 has a circumference 46a and a closed end 46b closest to atmosphere, such that the perimeter barrier 46 is in the form of an inverted cup. The perimeter barrier 46 is preferably constructed of a material which is at least partially impermeable to gas and extends to a depth below the minimum depth required for the dispersal field 42. The preferred construction material for the perimeter barrier 46 is PVC geomembrane. Although this is preferred, the perimeter barrier 46 may also be made from other materials such as an HDPE geomembrane or can be formed from a bentonite slurry or a soil cement wall. Alternatively, a clay or a chemical grout wall could be used. It will therefore be recognized by the skilled artisan that the perimeter barrier 46 could be made from any material which creates a barrier around the selected subterraneal volume 47 which is at least partially impermeable to air or another gas.

A pump 49 (schematically shown) having a gas intake side 49a and a discharge side 49b which discharges gas, which is preferably air, at a pressure greater than atmospheric pressure is provided. Preferably, the pump 49 is located remotely from the selected subterraneal volume 47, such as in the garage or basement of the house (not shown) connected to the sewage disposal system 40. However, it can be located in an above grade or underground housing located in proximity to the selected subterraneal volume 47. The discharge side 49b of the pump 49 is in fluid communication with the selected subterraneal volume 47, preferably via one or more drainage pipes 45, to lower the ground water level 30 within the perimeter barrier 46 to a level 32 at or below the minimum depth below grade required for the leach or drain field 42.

By pumping a gas, such as air, into the subterraneal volume 47, pneumatic pressure is built up within the subterraneal volume 46a, thereby forcing the natural groundwater level 30 to a lowered water level 32 within the subterraneal volume 47. In this way, the necessary separation distance between the bottom of the dispersal field 42 and the lowered water level 32 can be achieved. However, in doing so, the perimeter barrier 46 is also forced upwardly by pressure acting on the closed end 46b, making it necessary to employ ballasting of some type in order to anchor the perimeter barrier 46 within the ground.

Referring now to FIGS. 1-3, one such ballasting system 10 is shown in accordance with a preferred embodiment of the present invention. The ballasting system 10 preferably includes a flexible membrane 16 located adjacent the perimeter barrier end 46b of the sewage disposal system 40 and within the ground area. The flexible membrane 16 preferably extends over substantially the entire circumference 46a of the perimeter barrier 46. The flexible membrane 16 is preferably comprised by a first flexible sheet 16a and an adjacent second flexible sheet 16b. The first flexible sheet 16a allows water to permeate therethrough while impeding solid materials from passing therethrough. The second flexible sheet 16b reinforces soil above the perimeter barrier 46. The first flexible sheet 16a is preferably a geofabric and the second flexible sheet 16b is preferably a geogrid.

The geofabric is preferably constructed of a non-woven cloth used for separating layers of materials. Geofabrics, such as Geotex® 801 sold by SI Geosolutions, located in Chattanooga, Tenn., are commonly used in construction for separating various materials, such as dirt and rocks, for instance. The geofabric also impedes solid materials, such as rocks and soil, from passing therethrough. The geogrid is preferably constructed of a polymeric material, such as a plastic material, for instance, which acts to reinforce the soil in which it is disposed, thereby providing the soil with tension strength. In this way, the geogrid is generally similar to rebar used in concrete. Geogrids of this type, such as TerraGrid® B120, are sold by WEBTEC, LLC, located in Charlotte, N.C. While it is preferred that the flexible membrane 16 be formed of a geofabric and a geogrid, it is understood by those skilled in the art from this disclosure that the geofabric could be omitted without departing from the spirit and scope of the invention.

The ballasting system 10 further preferably includes a plurality of ballasting beams 12 located above the flexible membrane 16 and within the ground area. The ballasting beams 12 are preferably constructed of concrete. The ballasting beams 12 should be sufficient in number so as to enable the plurality of ballasting beams 12 to extend at least a length 40a of the on-site sewage treatment and disposal system 40. The ballasting beams 12 preferably extend generally parallel with respect to each other and are disposed with a space therebetween. As such, the number of ballasting beams 12 used with the ballasting system 10 depends upon the length 40a of the sewage disposal system 40 and upon the desired spacing between the ballasting beams 12. Each of the ballasting beams 12 should extend across the entire circumference 46a of the perimeter barrier 46. Each end of the ballasting beams 12 is anchored within the ground area by an anchor 14, such as the PISA® (Power Installed Screw Anchors) sold by A. B. Chance, a Division of Hubbell Power Systems, Inc., located in Centralia, Mo. The length of each ballasting beam 12 should be sufficient to at least span the circumference of the sewage disposal system 40 so as to enable the anchors 14 disposed at each end of the ballasting beams 12 to be sufficiently spaced from the sides of the sewage disposal system 40 so as not to interfere with the proper functioning thereof. Anchoring of the ballasting beams 12 in this way inhibits the upward migration of the ballasting beams 12 within the ground.

The perimeter barrier 46 is preferably installed around the selected subterraneal volume 47 by excavating a trench around the volume 47, or alternatively by excavating the entire subterraneal volume 47. The entire subterraneal volume 47 can be excavated and the soil replaced with a better quality soil for the leach or drain field 42. One or more drainage pipes 44 adapted to receive fluid are at least partially located within the subterraneal volume 47 inside the perimeter barrier 46. Preferably, the drainage pipes 44 comprise perforated pipe or drain tiles arranged as a conventional leach or drain field. Preferably, the drainage pipes 44 are placed in a gravel or crushed stone bed (not shown) and back-filed with soil, and are sized and installed in the same manner as a conventional leach or drain field. However, it will be understood by those skilled in the art that the drainage pipes 44 and stone bed (not shown) refer to any fluid carrying system, such as The Infiltrator® Chamber System for leach fields, available from Infiltrator systems, Inc., Old Saybrook, Conn., such as described in U.S. Pat. Nos. 5,017,041; 5,156,488; and 5,336,017.

Preferably, once the sewage disposal system 40 is placed within the ground and the perimeter barrier 46 is installed, the anchors 14 are installed. The flexible membrane 16 is disposed adjacent and across the top of the perimeter barrier end 46b. The ballasting beams 12 are then laid on top of the flexible membrane 16 at predetermined intervals along the length of the sewage disposal system 40. The anchors 14 (preferably two per ballasting beam 12, one proximate each end) are used to anchor the ballasting beams 12 to the ground. The ground area above the flexible membrane 16 and ballasting beams 12 is then back-filled with soil to the natural topographic ground surface level or a different level, if so specified.

In this way, when air pressure is raised within the perimeter barrier 46, the sewage disposal system 40 is restrained from migrating upwardly in the ground. In this way, the ballasting system 10 counteracts the forces associated with air pressure in void spaces in the subterraneal volume 47.

The first flexible sheet 16a and the second flexible sheet 16b of the flexible membrane 16 act to limit the amount of deflection of the perimeter barrier 46 between the ballasting beams 12. As was stated above, the sewage disposal system 40 and the perimeter barrier 46 thereof are forced upwardly due to the air pressure within the perimeter barrier 46. Because the ballasting beams 12 have spacing therebetween, the flexible membrane 16 disposed between ballasting beams 12 is essentially partially unrestrained, and therefore, bulges slightly upwardly due to forces on the perimeter barrier 46 resulting from the air pressure therewithin. Like the corrugated steel pieces previously used, the flexible membrane 16 acts to limit the amount of this upward bulging. However, unlike the steel pieces, the flexible membrane 16 allows for some give, thereby allowing the perimeter barrier to deflect slightly. A certain amount of deflection is acceptable and is required in order for the flexible membrane 16 to reach its full strength potential. However, it is noted that, while the flexible membrane 16 deflects slightly under load from the pressurized perimeter barrier 46, preferably the deflection is absorbed by the fill material disposed above the flexible membrane 16 and does not influence the topography of the ground surface above the sewage disposal system 40.

The ballasting beams 12, the first flexible sheet 16a, and the second flexible sheet 16b of the flexible membrane 16 essentially replace the engineered steel assemblies of previous ballasting systems. For this reason, there is no longer a need for a corrosion resisting system, such as cathodic protection. Moreover, the ballasting system 10 of the present invention is easier and/or cheaper to install than previous ballasting system using concrete slabs or engineered steel assemblies. Also, unlike the concrete slab ballasting system, the ballasting system 10 of the present invention can be disassembled and reused. Lastly, the use of the ballasting system 10 eliminates the need for using fill to ballast the sewage disposal system 40, which is especially beneficial in flood plains in which the use of fill is prohibited.

It will be appreciated by those skilled in the art that changes could be made to the embodiment described above without departing from the broad inventive concepts thereof. For instance, it is possible that the flexible membrane 16 could be omitted or only cover a portion of the perimeter barrier 46. It is understood, therefore, that this invention is not limited to the particular embodiment disclosed, but it is intended to cover modifications within the spirit and scope of the present invention.

What is claimed is:

1. A ballasting system for an on-site sewage treatment and disposal system for areas having a ground water level above a minimum depth below grade comprising
    a perimeter barrier arranged around a selected subterraneal volume within a ground area, said perimeter barrier having a circumference and a closed end closest to atmosphere;
    a pump having a gas intake and a discharge side which discharges gas at a pressure greater than atmospheric pressure, the discharge side of the pump being in fluid communication with the selected subterraneal volume to lower the ground water level within the perimeter barrier to a level at or below the minimum depth below grade;
    a flexible membrane located adjacent the perimeter barrier end and within the ground area, wherein the flexible membrane extends over substantially the entire circumference of the perimeter barrier; and
    a plurality of ballasting beams located above the flexible membrane and within the ground area, wherein
        each of the beams extends across the circumference of the perimeter barrier and
        each end of the beams being anchored within the ground area by an anchor.

2. The ballasting system of claim 1 where the perimeter barrier is constructed of a material which is at least partially impermeable to gas.

3. The ballasting system of claim 2 where the perimeter barrier material is selected from the group consisting of a PVC geomembrane, an HDPE geomembrane, a bentonite slurry, clay, a soil cement wall, and a chemical grout wall.

4. The ballasting system of claim 1 where the flexible membrane is comprised by a first flexible sheet which allows water to permeate therethrough and an adjacent second flexible sheet which reinforces soil above the perimeter barrier.

5. The ballasting system of claim 4 where the first flexible sheet also impedes solid materials from passing therethrough.

6. The ballasting system of claim 4 where the first flexible sheet is a geofabric and the second flexible sheet is a geogrid.

7. The ballasting system of claim 6 where the geofabric is constructed of a non-woven cloth and the geogrid is constructed of a polymeric material.

8. The ballasting system of claim 1 where the plurality of beams extends at least a length of the on-site sewage treatment and disposal system.

9. The ballasting system of claim 8 where the beams extend generally parallel with respect to each other and are disposed with a space therebetween.

10. The ballasting system of claim 1 where the beams are constructed of concrete.

11. A ballasting system for an on-site sewage treatment and disposal system for areas having a ground water level above a minimum depth below grade comprising
   a perimeter barrier arranged around a selected subterraneal volume within a ground area, said perimeter barrier having a circumference and a closed end closest to atmosphere;
   a pump having a gas intake and a discharge side which discharges gas at a pressure greater than atmospheric pressure, the discharge side of the pump being in fluid communication with the selected subterraneal volume to lower the ground water level within the perimeter barrier to a level at or below the minimum depth below grade; and
   a plurality of ballasting beams located above the perimeter barrier and within the ground area, wherein
      each of the beams extends across the circumference of the perimeter barrier and
      each end of the beams being anchored within the ground area by an anchor.

12. The ballasting system of claim 11 where the perimeter barrier is constructed of a material which is at least partially impermeable to gas.

13. The ballasting system of claim 12 where the perimeter barrier material is selected from the group consisting of a PVC geomembrane, an HDPE geomembrane, a bentonite slurry, clay, a soil cement wall, and a chemical grout wall.

14. The ballasting system of claim 11 where a flexible membrane is located adjacent the perimeter barrier end and within the ground area, wherein the flexible membrane extends at least over substantially the entire circumference of the perimeter barrier.

15. The ballasting system of claim 14 where the flexible membrane is comprised by a first flexible sheet which allows water to permeate therethrough and an adjacent second flexible sheet which reinforces soil above the perimeter barrier.

16. The ballasting system of claim 15 where the first flexible sheet also impedes solid materials from passing therethrough.

17. The ballasting system of claim 15 where the first flexible sheet is a geofabric and the second flexible sheet is a geogrid.

18. The ballasting system of claim 17 where the geofabric is constructed of a non-woven cloth and the geogrid is constructed of a polymeric material.

19. The ballasting system of claim 14 where the plurality of beams are located above the flexible membrane and within the ground area.

20. The ballasting system of claim 11 where the plurality of beams extends at least the length of the on-site sewage treatment and disposal system.

21. The ballasting system of claim 20 where the beams extend generally parallel with respect to each other and are disposed with a space therebetween.

22. The ballasting system of claim 11 where the beams are constructed of concrete.

* * * * *